Feb. 21, 1928.

R. C. F. KURTZE

COUPLING

Filed Nov. 4, 1926

Inventor:
Reimar C. F. Kurtze

Feb. 21, 1928.
R. C. F. KURTZE
COUPLING
Filed Nov. 4, 1926
1,659,693
2 Sheets-Sheet 2
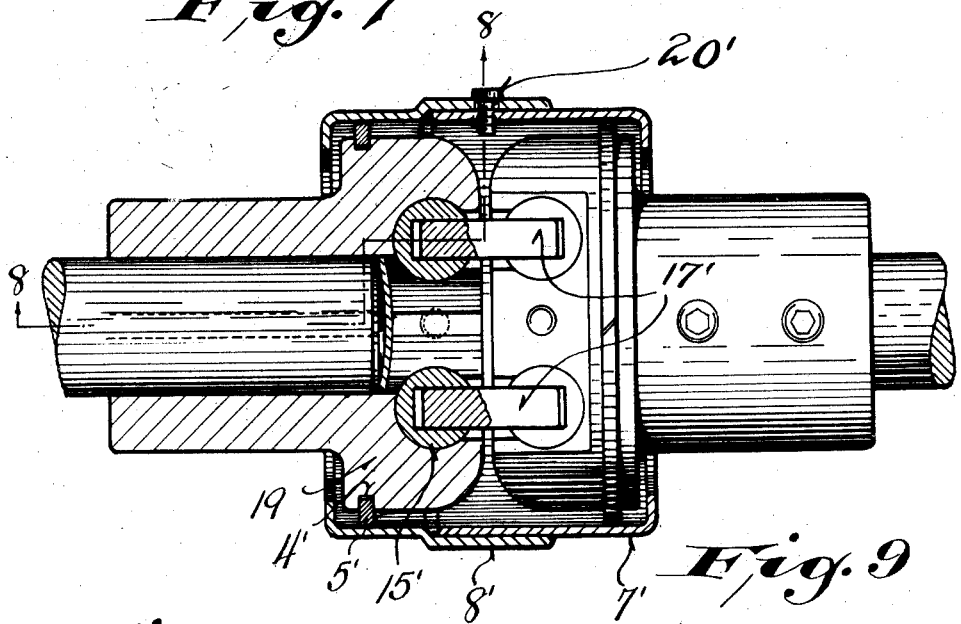
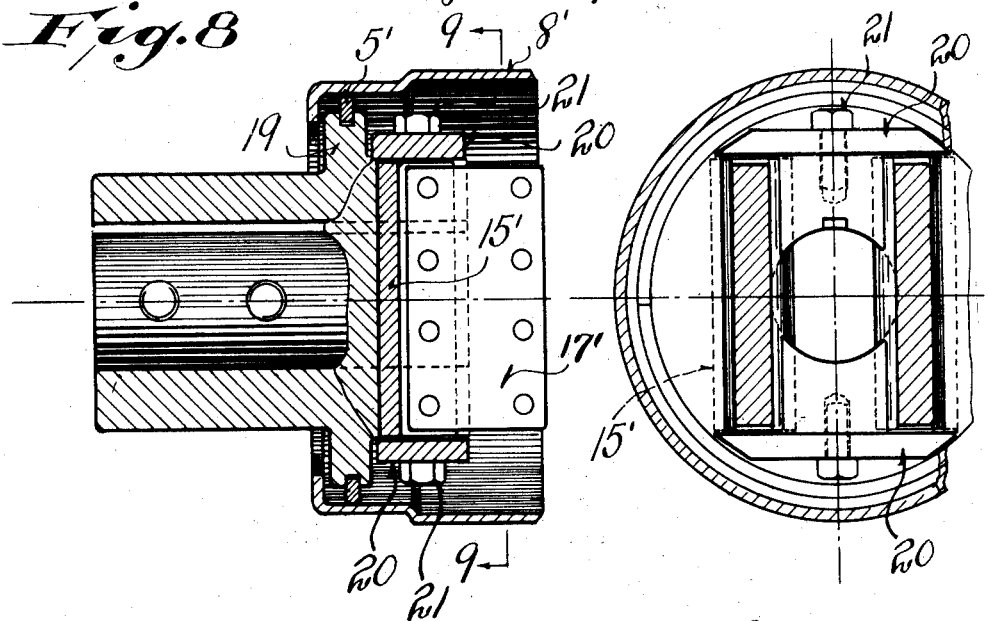
Inventor
Reimar C. F. Kurtze
By Young & Young
Attorneys Patented Feb. 21, 1928.

1,659,693

UNITED STATES PATENT OFFICE.

REIMAR C. F. KURTZE, OF MILWAUKEE, WISCONSIN, ASSIGNOR TO KURTZE FLEXIBLE COUPLING COMPANY, A CORPORATION OF WISCONSIN.

COUPLING.

Application filed November 4, 1926. Serial No. 146,084.

This invention relates to flexible couplings.

Objects of this invention are to provide a mechanical appliance which will transfer the twist or torque of one shaft to a second shaft, although the axes of the shafts may not be in alignment, but may be at an angle to each other or else may be spaced apart in different planes, so that they do not cross each other.

Further objects are to provide a device of this nature with the least number of parts and of the simplest form, although maintaining a mechanically correct contact of the moving parts in all positions, and to enclose the entire structure in a dust-proof and lubricant retaining jacket of inexpensive construction.

Further objects are to provide a coupling in which the several parts may be made with the simplest mechanical operations employing standard automatic and semi-automatic machinery, thus producing an article of the above type at the lowest possible price secured by quantity production.

Further objects are to provide a novel form of coupling construction which is adapted for use on the smallest as well as the largest machines, thereby establishing a standard article in the market as distinguished from the multitude of different types of couplings necessary when changing from a large to a small transfer of power.

Further objects are to provide a novel form of coupling which may be made primarily from standard stock material, thus materially aiding in the reduction of the cost of manufacture.

Embodiments of the invention are shown in the accompanying drawings in which:

Figure 7 is a view of a modified form;

Figure 8 is a sectional view on the line 8—8 of Figure 7;

Figure 9 is a sectional view on the line 9—9 of Figure 8.

Figure 1:
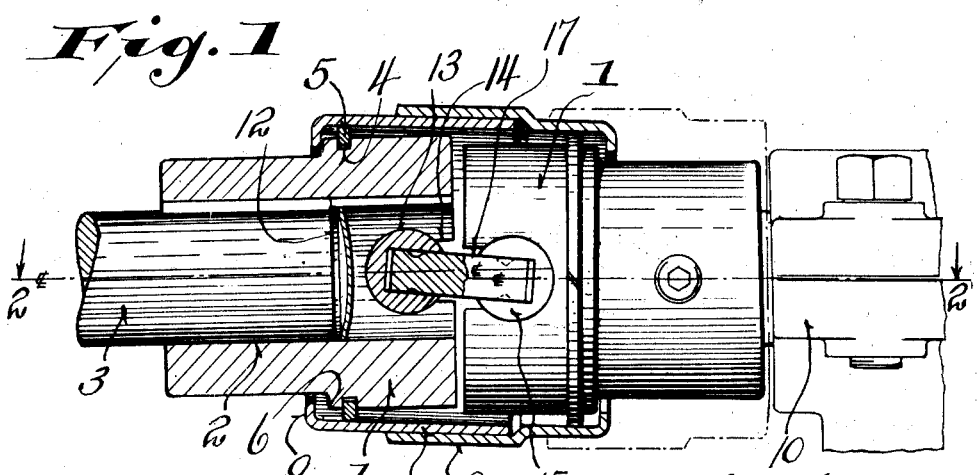
Figure 1 is a view of the coupling with parts in section.
Figure 2:
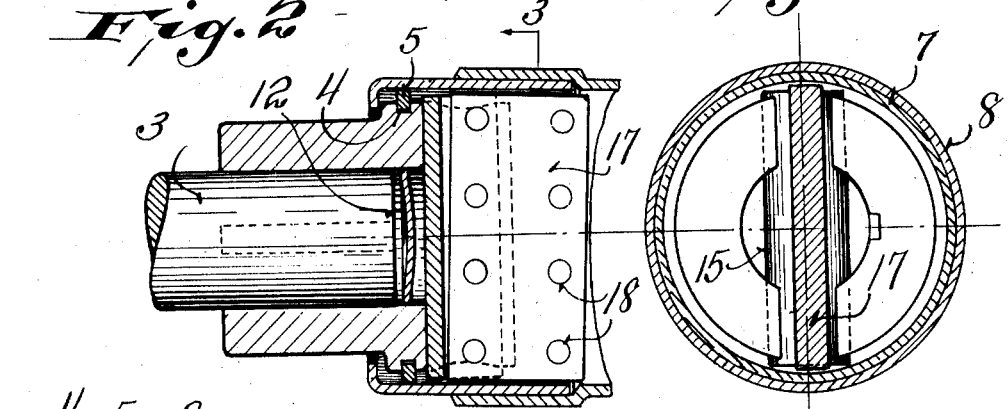
Figure 2 is a view on the line 2—2 of Figure 1, showing one of the couplings, with such coupling in section.
Figure 3:
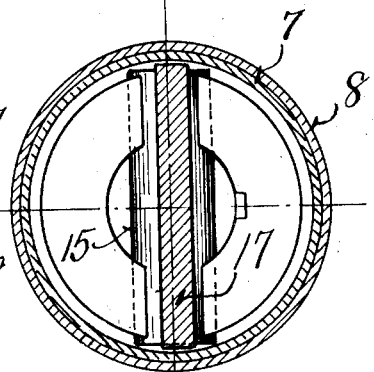
Figure 3 is a sectional view on the line 3—3 of Figure 2.

Referring to the first form of the invention shown in Figures 1 to 6, it will be seen that the coupling comprises a pair of heads or body portions 1 which are preferably formed from standard stock material. These head portions are provided with a central bore 2 and are keyed to the shafts 3. Further, it is to be noted that each of the head portions 1 is provided with an annular groove 4 within which a piston ring 5 is positioned. Further, the head portions are provided with shoulders 6.

A pair of telescopically related sleeves 7 and 8 form a jacket whose inner face is engaged and sealed by means of the piston rings 5. This jacket is made in two parts, as indicated particularly in Figure 1, and is provided with inturned end flanges 9 positioned adjacent the shoulders 6. The jacket is adapted to contain a lubricant and escape of the lubricant is prevented by the piston rings 5. Further this jacket positions the torque transmitting members, as will hereinafter appear.

It is to be noted from the dot and dash line in Figure 1, that although the main bearing 10 of one of the shafts may be closely adjacent the coupling, that nevertheless the corresponding half of the two part jacket may be slipped rearwardly into contact with the bearing and will thus give free access to the several parts of the coupling.

Figure 6:
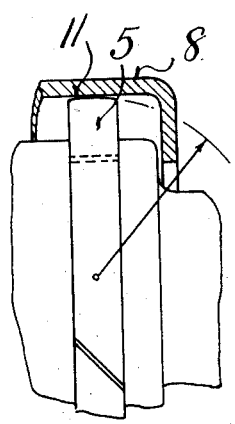
Figure 6 is a fragmentary view drawn to an enlarged scale showing a detail of the packing ring.
Figure 4:
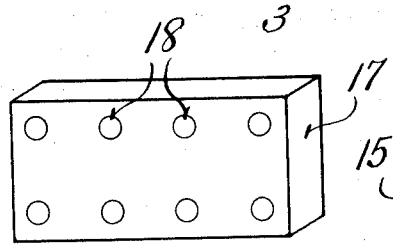
Figure 4 is a detail of the connecting member.
Figure 5:
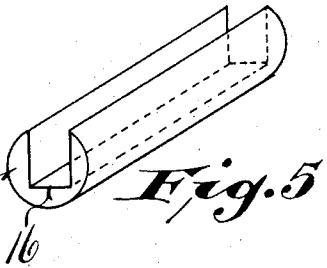
Figure 5 is a detail showing one of the bolsters.

In regard to the piston rings 5, it is to be particularly noted from Figure 6, that their outer surfaces 11 are curved with the center of curvature as indicated in Figure 6. This permits the casing to freely rock and position itself when the shafts are out of alignment.

Preferably, the heads or body portions 1 are bored completely through to receive the shafts. This opening may be closed by a metal disc 12, as shown in Figure 1, to prevent loss of lubricant even if the coupling is removed from the shafts.

The body portions or heads 1 are drilled to provide diametrically extending holes or sockets 13 at right angles to the axes of the heads. After this drilling operation, the heads are lined up and clamped in place and a cutter is run transversely of the heads to form the slots 14 and thus open the sockets 13 to the outer face of the coupling head. This operation may be very readily performed and also by having the drilled holes 13 set back of the outer face of the coupling it becomes a simple matter to drill them by ordinary means as the outer face is not tangent to the drilled holes, but is spaced outwardly therefrom a material distance. This feature is highly important in quantity production as it clearly aids in the ease with which the device may be manufactured.

Within each of the apertures 13 a bolster 15 or rocking member is positioned. This member consists of a piece of cold rolled steel shafting which has been milled out to provide a rectangular opening 16. Most obviously, this milling operation can be easily performed and the entire shaft milled at one time and subsequently cut into lengths.

A rectangular key piece 17 is employed and is cut from a bar of cold rolled steel. This key piece fits within the rectangular slot or groove 16 in the bolster 15 and connects the two members. This key piece is provided with a plurality of shallow holes 18 which are formed by allowing the point of the drill to slightly enter the rectangular member 17. The holes are adapted to be packed with graphite, grease, or other lubricant when the coupling is assembled, it being understood that the shell or casing is also packed with lubricant, as previously described.

It is to be particularly noted that each of the head pieces or body portions is identical in construction and is formed as described by the simplest of mechanical operations and is capable of being produced by quantity production methods with semi-automatic or standard automatic machinery. The same is true of the bolsters and of the key pieces, the members being formed from standard stock material. Thus, the cost of materials in producing this coupling and the mechanical work thereon is reduced to a minimum and consequently the coupling may be produced at a very small cost.

In the assembled coupling, as may be seen from Figure 1, it is apparent that there is a small space left between the bottom of the grooves 16 in the bolsters 15 and the outer edges of the key piece. This permits relative axial motion of the two shafts, such as is necessary for assembling in the majority of electric motors. The coupling therefore, permits the motors to freely float and adjust themselves with the utmost facility.

It is to be noted from Figure 1, for instance, that the two shafts need not have their axes intersecting. This is a condition that is frequently met with in actual practice and is not usually taken care of, certainly not in a satisfactory manner by the usual couplings. In addition to this, the axes may be at an angle to each other for it is apparent that the bolsters will turn in their sockets and allow the parts to freely adjust themselves without any binding whatsoever.

Further, the in and out motion towards or from each other as made by the heads is taken care of by the sliding of the key piece in the grooves formed in the bolsters. Thus, it will be seen that the utmost flexibility and adaptability to the actual needs in practice is secured by this coupling. Further, the number of parts employed is reduced to a minimum and no additional fasteners are required for holding either the key piece or the bolsters in place, as the surrounding shell not only acts as a lubricant container, but also acts as a positioner for the bolsters and the key piece.

It frequently happens as previously pointed out with reference to Figure 1 that the bearing, as indicated at 10 in such figure, is closely adjacent the coupling. Even under these conditions, the coupling may be readily detached as the two part casing permits the sliding of the parts away from each other, one of the parts contacting with the bearing and yet clearing the key piece and, if desired, the bolster, thus permitting the key piece to be withdrawn laterally and the two shafts separated. It is, therefore, not necessary to dismantle or move the parts of the machine when disconnecting the coupling.

It is to be particularly noted that by having the bolsters formed of a single piece that there is no unequal distribution of pressure on the two sides of the bolster and that the bolster turns as a unit and merely pivots in the heads. There is, therefore, no possibility of wedging due to the angular setting or twist of the key piece and the net result is a uniform action of the coupling without excessive wear at any one point.

Further, it is to be particularly noted that the bearing faces are extensive surfaces both between the bolsters and the heads and between the key piece and the bolsters. Thus, the pressure per unit area is kept very low and cutting and rapid wear is thus prevented. In addition to this, the coupling runs in lubricant at all times in addition to the lubricant carried by the key piece in its pocket. This also materially prolongs the life of the coupling, particularly when it is realized that the casing or jacket forms a dust-proof and grit-proof enclosure and thus keeps out foreign materials.

In the form shown in Figures 7 and 9, it will be seen that a coupling is provided for the transmission of large amounts of energy. In this form, two key pieces 17' are employed with the corresponding slotted bolsters 15'. These bolsters are arranged in sockets paralleling each other formed in the heads 19, such heads being keyed to the shafts, as indicated. Also it is to be noted that the piston rings 5' are employed as in the form previously described. If desired, the two parts of the casing or jacket, as indicated at 7' and 8' may be held together by means of one or more screws 20'. Further, in this form of the invention, the casing is not relied upon to hold the bolsters and key pieces in place. Instead, two end plates 20 are employed on each head and locked in place by means of the cap screws 21. These end plates, as may be seen from Figure 9, have bevelled or rounded ends so that they may be made as thick as desired without contacting with the inner face of the jacket or casing.

This form of the coupling operates in the same manner as that previously described with, however, the additional feature that two key pieces and the associated bolsters are employed for transmitting the stresses. This form of invention is particularly applicable to slow moving shafts which are required to transmit an enormous torque.

It is obvious that this inventive idea could be carried out farther and any number of key pieces could be employed.

It is to be understood that the metal jacket surrounding the coupling is preferably formed of stamped sheet metal so that the maximum economy in manufacture is attained.

It will be seen that this invention provides a very simple type of coupling in which the floating rectangular key piece allows for axial self-adjustment of the parts and in which the one piece bolster materially aids in securing a uniform action of the parts and prevents unequal wear or wedging.

It will be seen further that the two piece telescopic jacket or shell is connected to both of the heads or body portions by means of the metallic piston rings. This jacket, therefore, serves effectively as a lubricant retainer and also as a positioner for the parts of the coupling. Further, the slightly recessed key piece provides for the packing of a lubricant in the key piece itself during the assembling of the coupling and materially aids in the ease with which the parts may be kept free from frictional losses or from wear.

Although the invention has been described in considerable detail, such description is intended as illustrative rather than limiting as the invention may be variously embodied and as the scope of such invention is to be determined as claimed.

I claim:

1. A coupling comprising a pair of opposed body portions each having a transversely arranged socket therein, a cylindrical member seated in each socket and each cylindrical member having a rectangular groove extending axially of such cylindrical member, and a rectangular key piece seated within each of said rectangular grooves and free from attachment to said cylindrical members whereby rocking motion alone occurs between the cylindrical members and the body portions.

2. A coupling comprising a pair of similar body portions having opposed faces and having transversely extending cylindrical apertures therein opening through their opposed faces, a cylindrical bolster member mounted for rocking motion within each of said sockets and having rectangular grooves extending axially of such bolster members, and a rectangular key piece seated within said grooves, said key piece and said bolster members being of substantially the same length measured transversely of the axis of the coupling, whereby said cylindrical members are free from shifting relatively to the corresponding body portions.

3. A coupling comprising a pair of similar body portions having opposed faces and having transversely extending cylindrical apertures therein opening through their opposed faces, a cylindrical bolster member mounted for rocking motion only within each of said sockets and having rectangular grooves extending axially of such bolster members, and a rectangular key piece seated within said grooves, said key piece and said bolster members being of substantially the same length measured transversely of the axis of the coupling, the cylindrical surfaces of said apertures in each body portion extending around its corresponding bolster member more than one hundred and eighty degrees, whereby said bolster members can be removed only axially of said apertures.

4. A coupling comprising a pair of body portions having opposed faces provided with diametrically arranged slots therein and having a cylindrical socket extending transversely of the axes of such body portions and communicating with said slots, cylindrical bolster members mounted for rocking motion within said sockets and having rectangular grooves extending axially of such bolster members, a rectangular key piece seated within said sockets, and a shell surrounding said body portions and positioning the bolster members and key piece, said body portions being laterally shiftable with respect to each other.

5. A coupling comprising a pair of body portions having opposed faces provided with diametrically arranged slots therein and having a cylindrical socket extending transversely of the axes of such body portions and communicating with said slots, cylindrical bolster members mounted for rocking motion within said sockets and having rectangular grooves extending axially of such bolster members, a rectangular key piece seated within said grooves, and a cylindrical shell surrounding said body portions and adapted to position the bolster members and key piece, whereby said body portions may be shifted laterally with respect to each other.

6. A coupling comprising a pair of opposed body portions each having a transversely arranged socket therein, a cylindrical member seated in each socket and having a rectangular groove extending axially of such cylindrical member, and a rectangular key piece seated within each of said rectangular grooves, said key piece being transversely removable from said cylindrical members to disconnect the opposed body portions.

7. A coupling comprising a pair of body portions having opposed faces provided with diametrically arranged slots therein and having a cylindrical socket extending transversely of the axes of such body portions and communicating with said slots, cylindrical bolster members mounted for rocking motion within said sockets and having rectangular grooves extending axially of such bolster members, a rectangular key piece seated within said grooves, and a shell surrounding said body portions and adapted to position the bolster members and key piece, said shell being formed of two telescopically related parts of such length that they may be drawn apart in a confined space to permit lateral withdrawal of such key piece.

8. A coupling comprising a pair of opposed body portions each having a transversely arranged socket therein, a cylindrical member seated in each socket and each cylindrical member having a rectangular groove extending axially of such cylindrical member, and a rectangular key piece free from attachment to one of said cylindrical members seated within each of said rectangular grooves, whereby said body portions may have their axes offset and at an angle to each other.

9. A coupling comprising a pair of opposed body portions each having a transversely arranged cylindrical socket therein, said sockets being open ended and of the same diameter throughout, a cylindrical member seated in each socket and each cylindrical member having a rectangular groove extending axially of such cylindrical member, and a rectangular key piece seated within each of said rectangular grooves, whereby said body portions may have their axes offset and at an angle to each other.

In testimony that I claim the foregoing I have hereunto set my hand at Milwaukee, in the county of Milwaukee and State of Wisconsin.

REIMAR C. F. KURTZE.